(12) United States Patent
Horiuchi et al.

(10) Patent No.: US 7,474,446 B2
(45) Date of Patent: Jan. 6, 2009

(54) COLOR REDUCTION PROCESSING APPARATUS, PRINTER CONTROL DEVICE, COLOR REDUCTION METHOD, AND PRINTER CONTROL METHOD

(75) Inventors: Yukiharu Horiuchi, Chino (JP); Michael Mannion, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 805 days.

(21) Appl. No.: 11/000,475

(22) Filed: Nov. 30, 2004

(65) Prior Publication Data

US 2005/0140996 A1 Jun. 30, 2005

(30) Foreign Application Priority Data

Dec. 3, 2003 (JP) .............................. 2003-404481
Jan. 5, 2004 (JP) .............................. 2004-000349

(51) Int. Cl.
*G03F 3/08* (2006.01)
(52) U.S. Cl. ...................... 358/520; 358/1.9; 358/1.15; 358/518; 345/600; 345/589
(58) Field of Classification Search ................. 358/520, 358/1.9, 1.15, 518; 345/600, 589; 382/237
See application file for complete search history.

(56) References Cited

U.S. PATENT DOCUMENTS 5,710,872 A 1/1998 Takahashi et al.
6,559,975 B1 * 5/2003 Tolmer et al. ................. 358/1.9
6,762,852 B1 * 7/2004 Fischer ........................ 358/1.15
2002/0089514 A1 7/2002 Kitahara et al.
2002/0089686 A1 7/2002 Kitahara et al.
2002/0097436 A1 7/2002 Yokoyama et al.
2003/0002060 A1 * 1/2003 Yokoyama et al. ............ 358/1.9

FOREIGN PATENT DOCUMENTS

| JP | 568166 | 3/1993 |
|----|--------|--------|
| JP | 08-321957 | 12/1996 |
| JP | 9-74490 | 3/1997 |
| JP | 09-270926 | 10/1997 |
| JP | 1155539 | 2/1999 |
| JP | 11-187279 | 7/1999 |
| JP | 2000-101856 | 4/2000 |
| JP | 2001-197320 | 7/2001 |
| JP | 2002-269550 | 9/2002 |
| JP | 2002-288682 | 10/2002 |
| JP | 2002-314833 | 10/2002 |

* cited by examiner

*Primary Examiner*—King Y Poon
*Assistant Examiner*—Jamares Washington

(57) ABSTRACT

A color reduction processing apparatus and method reduce an original image containing many colors to a printable image containing few colors according to human color sensation. A conversion processing unit converts the pixel data for each pixel in an RGB color image (original image) to HLS data. A color reduction processor then generates print image data (the reduced-color image) reduced to a first color, second color, and a non-printing color by calculating the hue H, lightness L, and saturation S values of the HLS data based on specific parameters. These parameters can be set from an operating screen presented on a display. The original image and reduced-color image are presented on the display for verification by the user.

12 Claims, 9 Drawing Sheets

COLOR REDUCTION PROCESSING APPARATUS, PRINTER CONTROL DEVICE, COLOR REDUCTION METHOD, AND PRINTER CONTROL METHOD

BACKGROUND OF THE INVENTION

1. Field of the Invention

The present invention relates to a color reduction processing apparatus and method for converting color image data containing many colors to print image data containing fewer colors. The invention also relates to a printer control apparatus and method for printer control according to the type of printer by converting and outputting control commands and print data from a host system according to the type of printer, and more particularly for converting image data containing multiple colors, such as full-color image data, to print image data containing a first color, a second color, and a non-printing color.

2. Description of the Related Art

Because printers used in such commercial applications as POS (point-of-sale) systems and ATMs (automatic teller machines) print primarily letters, numbers and symbols, such printers are typically black and white monochrome printers that print black letters. Some recent POS systems, however, use color printers that can print both a primary print color, usually black, and an auxiliary print color such as red. This primary print color is referred to below as the "first color," the auxiliary print color is referred to as the "second color," and this type of color printer is referred to as a "two-color printer." Printing a logo, advertisement, or coupon, for example, using two colors of ink can improve the visual effect. A two-color printer is capable of three-color expressions, that is, the first color, the second color, and the non-printing color, which is the color of the print medium (paper). Gray scale printing in which the color density of the first and second print colors is varied in different levels is also possible by changing the dot density per unit area. This ability to print two colors in combination and to vary the density of each printed color enables a two-color printer to print relatively sharp color images using two print colors without particularly detracting from the original image, which may be a photograph or picture.

Image data from photographs and pictures typically contains many colors. These colors are often defined in the RGB color space using combinations of red (R), green (G), and blue (B). Image data for a full-color image in the RGB color space can be expressed using 256 levels (0 to 255) of color depth for each color, that is, red, green, and blue. Full-color image data can be reduced to image data for printing using fewer colors by various methods, including error diffusion, dithering, and halftoning. Direct application of these methods alone, however, often does not produce a satisfactory replica of the original full-color image using fewer colors. To solve this problem, methods of reducing full-color image data to eight colors by dithering, and then using the luminance value of each resulting pixel to convert the 8-color image data to three-color print image data, are provided in JP-A-2002-269550, JP-A-2002-288682, and JP-A-2002-314833.

While these techniques can use various processes to manipulate the image data, such techniques also present problems. More specifically, the reduced-color image output by the color reduction process greatly deviates from the original color image because the colors in an image expressed in the RGB color space, which is a three-dimensional space that is difficult to grasp visually, are reduced based on the individual RGB elements. The foregoing prior art also requires a two-part process, that is, reducing the full-color image data to eight colors and then reducing the eight colors to three colors (two print colors and the non-printing color of the paper), thus making the color reduction process and operation more complicated.

Furthermore, because the final output color in the RGB color model is determined by the individual color depth of the overlapping R, G, and B colors, which color should be specified at which threshold value is difficult to determine visually. As a result, the operator must incrementally adjust the color reduction threshold values while confirming the effect of the threshold values on the image after color reduction processing in a preview or test screen. The color reduction process is thus often time-consuming. What colors can be printed by the printer must also be defined as parameters for any color reduction process, but setting these color parameters is both a nuisance for the operator (user) and prone to error.

OBJECTS AND SUMMARY OF THE INVENTION

The present invention addresses the above-described problems of the prior art, and an object of the invention is to provide a color reduction processing apparatus and method enabling color reduction processing based on coloring more closely conforming to human color perception (sensation).

Another object of the invention is to provide a color reduction processing apparatus and method for generating print image data reduced to a few colors by means of a simple operation.

A further object of the invention is to provide a color reduction processing apparatus and method for applying the color reduction process according to the features of an original image containing many colors when generating print image data reduced to three colors including a first color, a second color, and a non-printing color.

A still further object of the invention is to provide a printer control apparatus and method for executing a color reduction adjustment process based on visually perceptible color tones, and enabling easy setting of printer parameters according to the functions of the printer.

When converting a color image to a first color and a second color, the present invention converts the RGB image data to HLS (Hue, Lightness, Saturation) image data, and enables specifying the color according to the hue H. The hue H in the HLS system is expressed by the color angle on a 360 degree circular axis ranging sequentially from red, orange, yellow, green, blue, indigo, to purple, and is thus easy to grasp visually. Hue H can thus be used to easily set the color reduction process to achieve the image intended by the user.

In furtherance of the foregoing objects, a color reduction processing apparatus according to a first aspect of the present invention comprises an image data acquisition unit for acquiring RGB color image data defined by RGB color values; a conversion processing unit for converting the RGB color image data to HLS color image data defined by HLS color values; and a color reduction processing unit for converting the HLS color image data to print image data that comprises a first color, a second color, and a non-printing color based on specific parameters.

Colors in the HLS color space are defined using elements approximating human color sensation, specifically hue H, lightness L, and saturation S. By executing a color reduction process based on these elements, a natural reduced-color image that is colored with a close approximation to human color perception can be produced.

Preferably, this color reduction processing apparatus also includes a parameter setting unit for setting a hue range Hs for the second color, and the color reduction processing unit converts the HLS color image data to print image data based on the hue range Hs setting.

Hue is close to the sensation by which humans recognize color. Therefore, by defining a hue range as a parameter for color reduction, the user can more easily visualize what the image will look like after color reduction; thus creating a reduced-color image is easier.

In a color reduction processing apparatus according to a further aspect of the present invention when the first color is set to black, and the color reduction processing unit includes: a hue ratio calculation unit for calculating a hue ratio Hr based on a target pixel hue Hp, the second color hue H2, and the hue range Hs according to the equation: $Hr=1-||180-Hp-H2|-180|/Hs$, where arc distance Hp-H2 can be represented as $|Hp-H2|$, where if $Hr \leqq 0$, then $Hr=0$; a lightness ratio calculation unit for calculating a lightness ratio Lr between the target pixel lightness Lp and the second color lightness L2 based on the equation: $Lr=(1-Lp)/(1-L2)$, where if $Lr \geqq 1$, then $Lr=Lp/L2$, and Lp and L2 are in the range 0.00 to 1.00; a saturation ratio calculation unit for calculating the saturation ratio Sr between the target pixel saturation Sp and the second color saturation S2 based on the equation: $Sr=Sp/S2$, where if $Sr \geqq 1$, then $Sr=1$; a second color data calculation unit for calculating a second color ratio R2 based on the calculated hue ratio Hr, the lightness ratio Lr, and the saturation ratio Sr using the equation: $R2 = Hr*Lr*Sr$, where * denotes multiplication; and a first color data calculation unit for calculating a first color ratio Rk based on the equation: $Rk=1-Lp-R2*(1-L2)$.

Preferably, the hue range Hs is set as a value in the range of 1° to 180°. Also, at least one of the hue H2, the lightness L2, or the saturation S2 of the second color can be defined as a parameter.

Preferably, the print image data generated by the color reduction processing unit is converted to a color different from the second color and displayed.

When the original image is based on a color that is different from the second color that can be printed by the printer, that base color is specified as the second color for the color reduction process generating the print image data, and the base color can then be replaced in the resulting print image data with the printable second color for printing. A reduced-color image that accurately reproduces the features of the original image can thus be generated. Furthermore, by converting the reduced-color image to the printable colors and displaying the result, the user can verify the appearance of the image that will actually be printed.

A printer control device according to another aspect of the present invention has a data acquisition unit for acquiring specific information including color information indicating a first color and a second color that can be printed by a printer; an image data acquisition unit for acquiring RGB color image data defined by RGB color values; a conversion processing unit for converting the RGB color image data to HLS color image data defined by HLS color values; a color reduction processing unit for converting the HLS color image data to print image data containing the first color, the second color, and a non-printing color; a data conversion unit for converting the print image data to a specific data format that is printable by the printer; and a parameter setting unit for setting a hue range as a parameter. The color reduction processing unit changes the hue starting point used as the reference point of the hue range according to the color information for the second color, and converts the HLS color image data to the print image data based on the starting point and the hue range.

Preferably, the data acquisition unit in this printer control device acquires the specific information from a printer in communication with the printer control device.

The data acquisition unit in this aspect of the invention automatically acquires printer-specific information from the printer, including the colors of ink that the printer can print and the printing resolution. Manually entering the printer-specific information is therefore not necessary when the printer is replaced or the printable colors are changed, such as by changing the ink cartridge, thus affording easier operation and preventing data entry errors.

In a printer control device according to a further aspect of the present invention, the first color is set to black, and the color reduction processing unit includes a hue ratio calculation unit for calculating a hue ratio Hr, a lightness ratio calculation unit for calculating the lightness ratio Lr, a saturation ratio calculation unit for calculating the saturation ratio Sr, a second color data calculation unit for calculating the second color ratio R2, and a first color data calculation unit for calculating the first color ratio Rk. The equations for Hr, Lr, Sr, R2 and Rk are the same as those described above in connection with the apparatus.

In this aspect of the invention the hue range Hs is used as a parameter of the color reduction process. The hue range Hs is defined as an angle, and indicates the range of hues on both sides (plus and minus) of a particular hue reference point (starting point). Because human color sensation perceives hue, the image resulting from color reduction based on this hue parameter is easy to discern.

A color reduction method according to another aspect of the present invention comprises (a) converting RGB color image data defined by RGB color values to HLS color image data defined by HLS color values; and (b) converting the HLS color image data to print image data that comprises a first color, second color, and non-printing color based on specific parameters.

A printer control method according to another aspect of the present invention comprises (a) acquiring RGB color image data defined by RGB color values; (b) converting the RGB color image data to HLS color image data defined by HLS color values; (c) converting the HLS color image data to print image data that comprises a first color and a second color printable by a printer, and a non-printing color; (d) converting the print image data to a specific data format that is printable by the printer; (e) acquiring specific information including color information indicating the first color and the second color; and (f) acquiring a hue range as a parameter. In addition, step (c) changes the hue starting point used as the reference point of the hue range according to the color information for the second color, and converts the HLS color image data to the print image data based on the starting point and the hue range.

Preferably, step (e) acquires the specific information from a printer.

Further preferably, step (d) adjusts the resolution and image size of the print image data based on the width of the printing paper and the print resolution.

In a printer control method according to a further aspect of the invention, the first color is black, and step (c) involves calculating Hr, Lr, Sr, R2, and Rk as described above.

A further aspect of the present invention is a computer-readable medium embodying a program of instructions for executing the foregoing color reduction method or printer control method.

The present invention first converts RGB color image data to HLS color image data, and then converts the HLS color image data based on the resulting hue H, lightness L, and saturation S values to print image data containing a first color, a second color, and a non-printing color. Because the HLS color space consists of hue, lightness, and saturation elements resembling human color perception (sensation), color reduction referenced to these elements produces a more natural reduced-color image that is closer to human color perception.

Furthermore, because hue is close to the sensation whereby people recognize color, setting the hue range as a control parameter makes it easier to visualize the image after color reduction, and thus makes creating a reduced-color image simple. More specifically, basing color reduction on hue affords a color reduction process based on human perception of color, and makes fine adjustment of the print image easier.

If the original image contains a key color other than the second color that can be printed by the printer, that key color is used as the second color for color reduction processing to generate the print image data, and the second color can then be substituted for that key color in the print image data for printing. A reduced-color image that accurately reproduces the characteristic features of the original image can thus be produced.

Furthermore, by converting the reduced-color image data to the actual printable colors and displaying the result on a monitor, the appearance of the actual image to be printed can also be confirmed.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Figure 1:
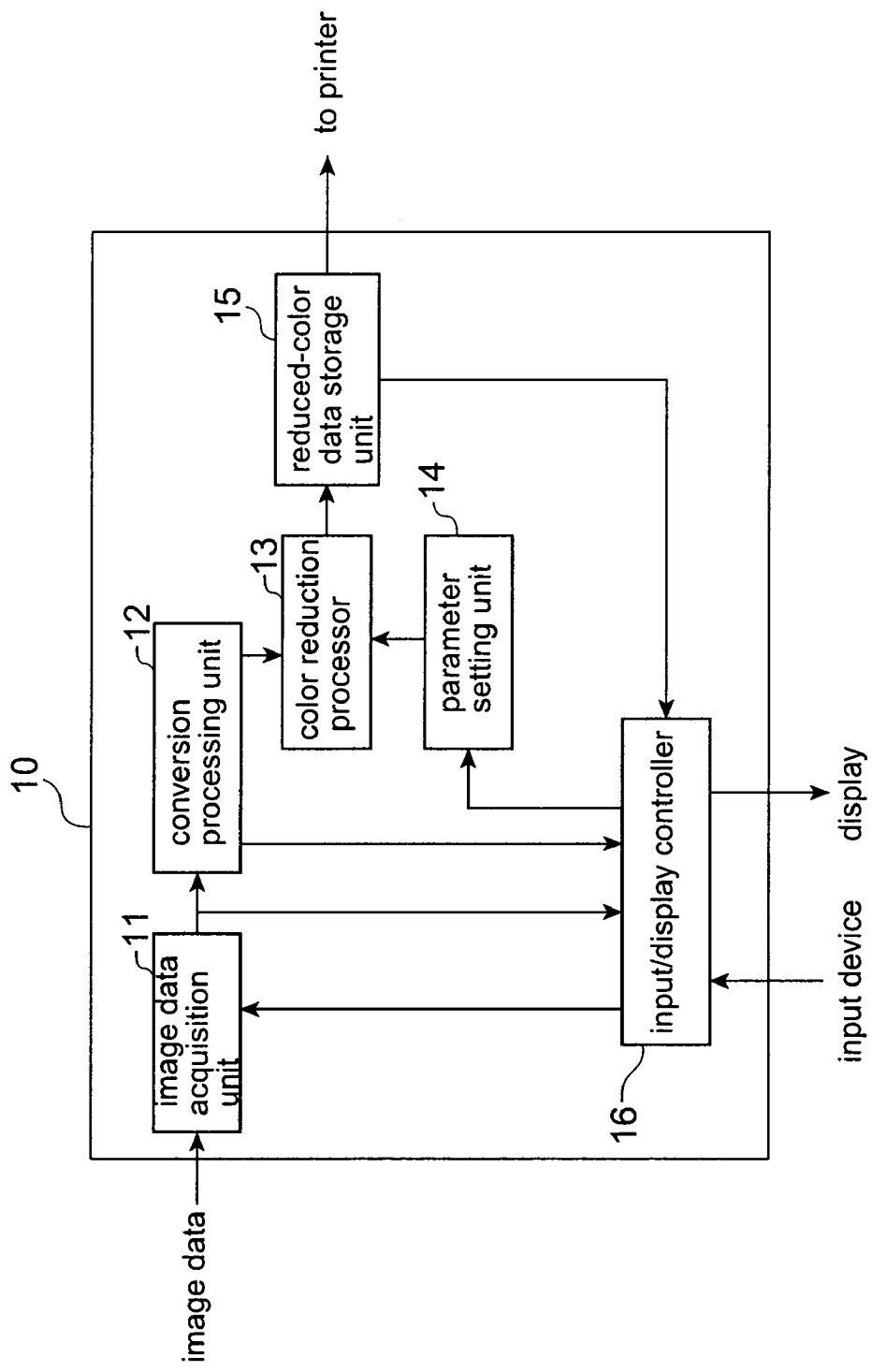
FIG. 1 is a functional block diagram of a color reduction processing apparatus, according to a preferred embodiment of the present invention.

FIG. 1 is a functional block diagram of a color reduction processing apparatus 10 according to a preferred embodiment of the present invention. As shown in FIG. 1, apparatus 10 has an image data acquisition unit 11, a conversion processing unit 12, a color reduction processor 13, a parameter setting unit 14, a reduced-color data storage unit 15, and an input/display controller 16.

The conversion processing unit 12 converts the image data (RGB color image data) acquired by the image data acquisition unit 11 to hue (H), lightness (L), saturation (S) data (HLS color image data), and the color reduction processor 13 then converts the resulting HLS data to print image data containing the first color, a second color, and a non-printing color. The resulting print image data is then stored to the reduced-color data storage unit 15.

The input/display controller 16 is in communication with a display device and input devices. The input/display controller 16 displays an operating screen on the display device, and accepts input from a pointing device or other input device. The user (operator) uses an input device to manipulate an operating screen of a graphical user interface (GUI) presented on the display, and can thereby instruct the image data acquisition unit 11 to acquire the desired image data. The input/display controller 16 also accepts parameter input via the operating screen. The input parameters are saved by the parameter setting unit 14.

The first color and second color that can be expressed after color reduction processing is completed are set in the parameter setting unit 14. The first color and second color are basically set to the colors that can be printed by the printer. The printer can usually print black, and black is therefore normally set as the first color. The second color can be set to any desirable color, such as red, blue, or green. A color different from the printable colors of the printer could also be set as the first color or second color for special applications. In this case the reduced-color image will be a different color than the image that is actually printed by the printer.

A parameter that specifies the range of hues in the HLS color space that are converted to the first color and second color for printing is also set in the parameter setting unit 14. The appearance of the image data after color reduction processing can be changed by adjusting this hue range as desired. Because the first color is normally black, this parameter is usually set for the second color. The hue of this second color is set in the parameter setting unit 14 as a range of angles referenced to a starting angle (origin). If the second color is red, for example, the HLS parameters for red are (0°, 29.7%, 100%) and the hue angle (0°) is therefore the origin. If the user then defines a hue range of 90°, all hues in the range from +90° to −90° of hue 0° (red) are converted to the second color.

Conversion from RGB to HLS Color Space

The image data acquisition unit 11 acquires the original image data (e.g., RGB color image data) from a scanner, digital camera, or other imaging device according to commands asserted from the operating screen. A data file containing the original image data could also be read from a storage disk using a disk drive. The acquired original image data is output to the input/display controller 16 and conversion processing unit 12. The input/display controller 16 presents the original image on the display, thereby enabling the user to verify the acquired image.

The conversion processing unit 12 converts each pixel in the acquired RGB color image data, that is, the original image data, to the corresponding H, L and S values of the HLS color space. Hue (H) is defined as an angle in the range of 0° to 360°, and lightness (L) and saturation (S) are defined as a percentage in the range of 0% to 100% (or a value in the range of 0.00 to 1.00). A conversion process for converting RGB color image data to HLS color image data is described more specifically below.

Hue H can be calculated using the following equations. Note that RGB values are multiplied by 1/255 for conversion to a value from 0 to 1 below. Note also that each pixel in the RGB color image data is defined using the RGB values (Rp, Gp, Bp).

If Rp is the highest of the RGB values (Rp, Gp, Bp) for the pixel being converted (the target pixel), hue H is calculated using equation (1):

$$H=\{60*(Gp-Bp)\}/\{Rp-(\text{the lesser of } Gp \text{ and } Bp)\} \quad (1)$$

If Gp is the highest of the RGB values (Rp, Gp, Bp), hue H is calculated using equation (2):

$$H=\{60*(Bp-Rp)\}/\{Gp-(\text{the lesser of } Rp \text{ and } Bp)\}+120 \quad (2)$$

If Bp is the highest of the RGB values (Rp, Gp, Bp), hue H is calculated using equation (3):

$$H=\{60*(Rp-Gp)\}/\{Bp-(\text{the lesser of } Rp \text{ and } Gp)\}+240 \quad (3)$$

However, if the hue H value calculated from equation (1) to (3) above is less than zero (H<0), then H=H+360.

Lightness L is calculated from equation (4):

$$L=(19/64)*Rp+(19/32)*Gp+(7/64)*Bp \quad (4)$$

Saturation S is calculated as follows:

If {[smallest of (Rp, Gp, Bp)]+[greatest of (Rp, Gp, Bp)]} ≦1, saturation S is calculated from equation (5):

$$S=\{[\text{greatest of } (Rp, Gp, Bp)]-[\text{smallest of } (Rp, Gp, Bp)]\}/\{[\text{greatest of } (Rp, Gp, Bp)]+[\text{smallest of } (Rp, Gp, Bp)]\} \quad (5)$$

If {[smallest of (Rp, Gp, Bp)]+[greatest of (Rp, Gp, Bp)]} >1, saturation S is calculated from equation (6):

$$S=\{[\text{greatest of } (Rp, Gp, Bp)]-[\text{smallest of } (Rp, Gp, Bp)]\}/\{2-[\text{greatest of } (Rp, Gp, Bp)]+[\text{smallest of } (Rp, Gp, Bp)]\} \quad (6)$$

For example, if the (Rp, Gp, Bp) values of the target pixel are (0.92, 0.55, 0.92) in a color reduction process where the first color is black and the second color is red, the corresponding HLS values for the target pixel obtained from the foregoing conditions and equations are (300°, 70%, 70%).

Color Reduction Processor

The conversion processing unit 12 outputs the converted HLS data to the color reduction processor 13 for reduction to the first color and second color. The color reduction processor 13 calculates the ratio between the first color and second color based on various parameters for each pixel in the HLS image data, dithers the result, and then outputs the resulting print image data.

Figure 2:
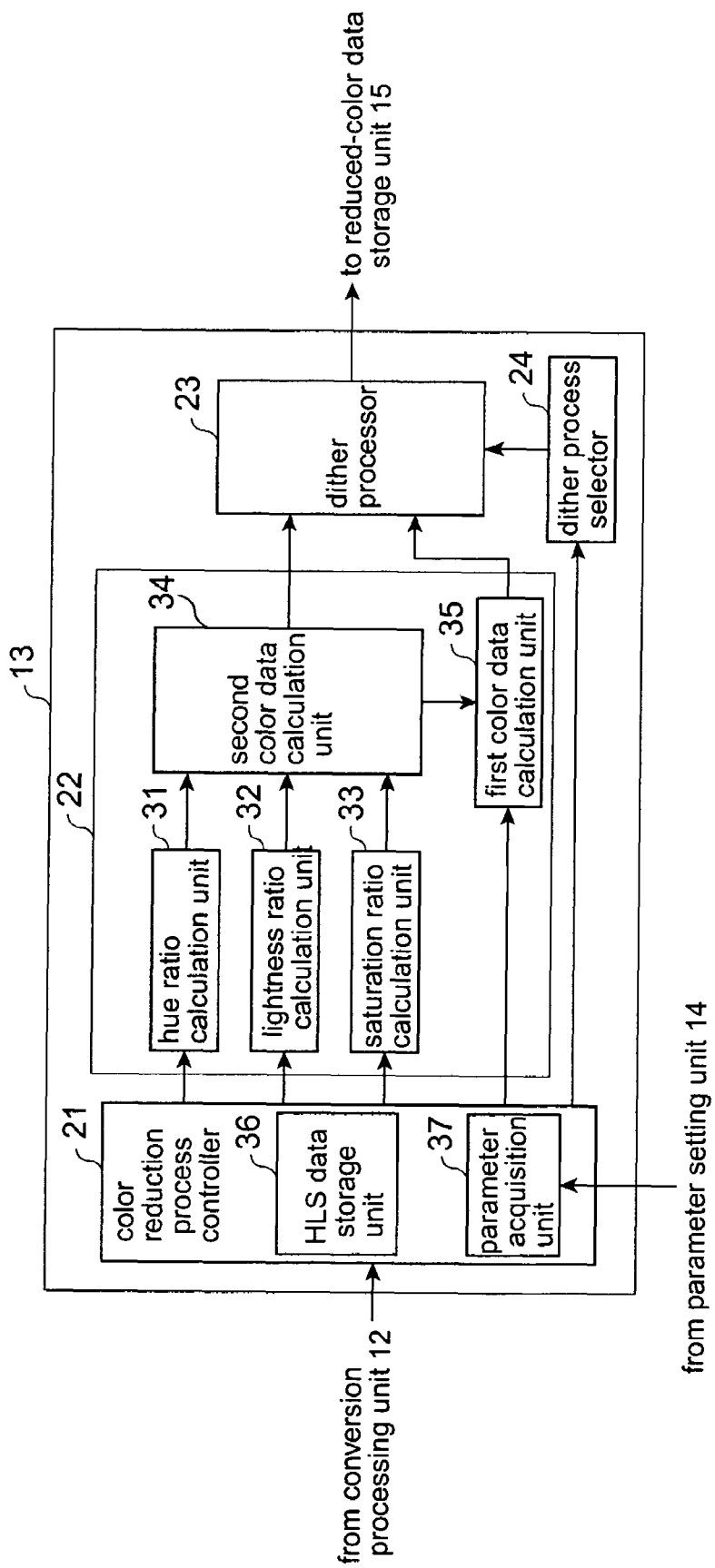
FIG. 2 is a functional block diagram of a color reduction processor, according to a preferred embodiment of the invention.

FIG. 2 is a functional block diagram of the color reduction processor 13 according to this embodiment of the invention. As shown in the figure, the color reduction processor 13 has a color reduction process controller 21, a color reduction operation processor 22, a dither processor 23, and a dither process selector 24 for setting the dither process applied by the dither processor 23.

The color reduction process controller 21 has an HLS data storage unit 36 for storing the HLS data output from the conversion processing unit 12, and a parameter acquisition unit 37 for getting the color reduction process parameters from the parameter setting unit 14. The color reduction process controller 21 thus controls the overall operation of the color reduction process. The color reduction process controller 21 outputs the acquired HLS data to the color reduction operation processor 22.

The color reduction operation processor 22 has ratio calculation units 31 to 33 for calculating the ratio between the first color and second color based on the H, L, and S values of each target pixel, a first color data calculation unit 35 for calculating the first color data ratio, and a second color data calculation unit 34 for calculating the second color data ratio.

Color Reduction Process

The color reduction process run by the color reduction operation processor 22 according to this embodiment of the invention is described next.

The following definitions are used in the color reduction process described below.

The first color is black, and the second color is red.

Rk and R2 denote the percentage (proportion) of the first color and second color in each pixel.

Hp, Lp, and Sp denote the H, L, and S values, respectively, converted from the R, G, and B values of the target pixel P in the color reduction process.

H2, L2, and S2 denote the respective HLS values for the second color.

Hr denotes how far (the hue ratio) the hue of the target pixel P is separated from the hue range Hs set by the parameter setting unit 14.

Lr denotes the lightness ratio of the target pixel P to the second color.

Sr denotes the saturation ratio of the target pixel P to the second color.

Lightness and saturation are in the range 0.00 to 1.00, inclusive.

The process described below is applied to each pixel in the image data converted to the HLS color space, and the same process is applied to every pixel in the image.

The hue ratio calculation unit 31 uses equation (7) to calculate the hue ratio Hr of the target pixel in the image data converted to the HLS color space.

$$Hr=1-||180-|Hp-H2||-180|/Hs, \quad (7)$$

where Hr=0 if the result is less than 0 and arc distance Hp–H2 can be represented as |Hp–H2|.

The lightness ratio calculation unit 32 uses equation (8) to calculate the lightness ratio Lr of the target pixel.

$$Lr=(1-Lp)/(1-L2), \quad (8)$$

where Lr=Lp/L2 if the result is greater than or equal to 1.

The saturation ratio calculation unit 33 uses equation (9) to calculate the saturation ratio Sr of the target pixel.

$$Sr=Sp/S2, \quad (9)$$

where Sr=1 if the result is greater than or equal to 1.

The second color data calculation unit 34 applies equation (10) to calculate the proportion R2 of the second color using the computed ratios Hr, Lr, Sr.

$$R2=Hr*Lr*Sr \text{ (* denotes multiplication)} \quad (10)$$

The first color data calculation unit 35 uses the calculated second color ratio R2 to calculate the proportion Rk of the first color from equation (11).

$$Rk=1-Lp-R2*(1-L2) \quad (11)$$

Data Calculation

Assuming the first color is black, the second color is red, the hue range Hs is 90°, and the HLS values of the target pixel P are (300°, 70%, 70%), denoting a light purple, the color reduction process described above produces the following values: Hr=0.333, Lr=0.426, and Sr=0.7. Calculating R2 and Rk from these values results in R2=10% and Rk=22.9%. The corresponding light purple pixel is thus 22.9% black (first color) and 10% red (second color) with the remainder being the non-printing color.

The dither processor 23 then dithers the image based on the calculated Rk and R2 values as described below using a pattern dithering process by way of example. This pattern dithering processing takes an image data target pixel at address (x,y), and sequentially compares each pixel in the image data with a 4×4 pixel mask pattern. The color is printed if the value of the corresponding pixel is greater than the value of the mask pattern, and is not printed if the value is less.

First, to compare all pixels in the image data using a 4×4 pixel mask pattern, the target pixel address is converted by the following equation to a value a.

$a$=(remainder of $x$/4)+(remainder of $y$/4)*4

This determines a particular one of the 16 values for a=0 to 15, and identifies one of the 16 values in the dither mask pattern.

The following mask is used as the dither mask pattern Pat{a}.

Pat{a}=(0.0/16.0, 1.0/16.0, 7.0/16.0, 3.0/16.0, 2.0/16.0, 6.0/16.0, 11.0/16.0, 10.0/16.0, 8.0/16.0, 12.0/16.0, 15.0/16.0, 14.0/16.0, 4.0/16.0, 5.0/16.0, 13.0/16.0, 9.0/16.0)

For example, when a=1, the mask pattern is 1.0/16.0 (=6.2%), and when a=11, the mask pattern is 14.0/16.0 (=87.5%).

The outputs Rk and R2 from the color reduction operation processor 22 for the comparison target pixel (x,y) are each compared with the mask pattern value, and whether the first color and second color are printed is determined according to the following conditions.

If Rk>Pat{a} and R2≦Pat{a}, the first color is printed for target pixel (x,y).

If R2>Pat{a} and Rk≦Pat{a}, the second color is printed for target pixel (x,y).

If Rk and R2 are both greater than Pat{a} for the same pixel, then:
 if x+y is even and R2>Rk, the second color is printed; if R2<Rk, the first color is printed;
 if x+y is odd and R2<Rk, the second color is printed; if R2>Rk, the first color is printed.

Flow Chart of the Color Reduction Process

Figure 3:
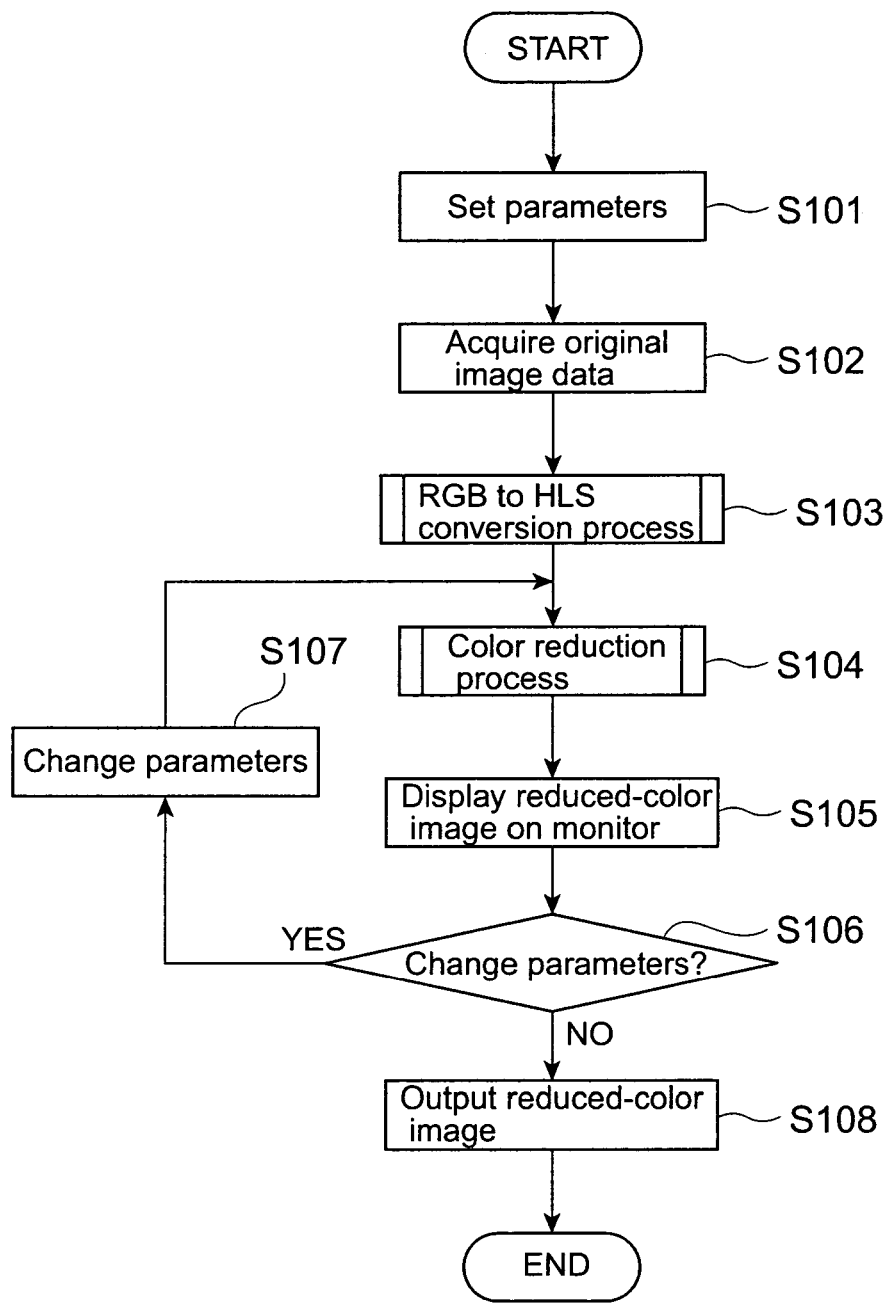
FIG. 3 is a flow chart of a color reduction process, according to a preferred embodiment of the invention.

A microprocessor (CPU) executes this color reduction process by running a control program stored in memory or other storage device based on data that is also stored in memory or other storage device. The color reduction process is described below with reference to the flow chart shown in FIG. 3.

The first step is to set parameters defining the first color, second color, and hue range (S101). The image data acquisition unit 11 then gets the original RGB image data as instructed by the user (S102). The acquired original image data could be displayed on a monitor. The RGB color image data is then converted to HLS data based on the defined parameters (S103), and reduced to the first color and the second color (S104). This conversion process and color reduction process are further described below. The reduced-color data (print image data) resulting from the color reduction process is then presented on the monitor (S105). If the user changes the parameters (S106 returns yes), the changed parameters are set (S107) and the color reduction process is run again using the changed parameters (S104).

If the user does not change the parameters after the print image data is displayed (S106 returns no), the reduced-color data is output to the reduced-color data storage unit 15 (S108).

Figure 4:
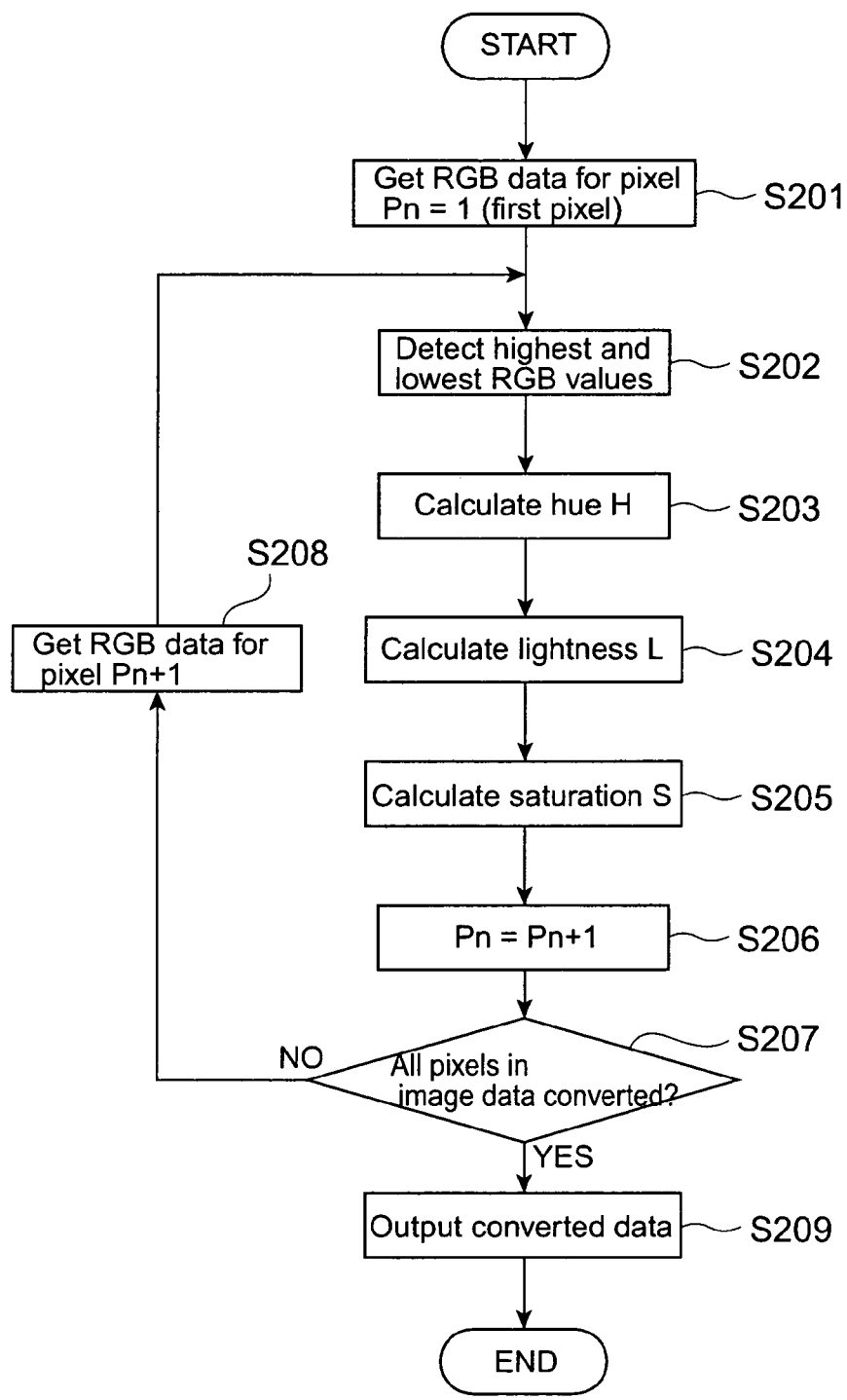
FIG. 4 is a flow chart of a preferred embodiment of the color space conversion process executed as step S103 in FIG. 3.

The conversion process (S103 in FIG. 3) is described next in connection with the flow chart of FIG. 4. The first step is to read the RGB data for the first pixel in the acquired image data (S201). The highest and lowest data values in the read RGB data are then determined (S202). Based on the result, the H, L, and S values are calculated (S203, S204, S205). More specifically, H is calculated using the above equations (1) to (3) (S203), L is calculated using the above equation (4) (S204), and S is calculated using the above equations (5) and (6) (S205).

The pixel address is then increased by one (S206), and whether all pixels have been processed is determined (S207). If all pixels have not been processed (S207 returns no), the RGB data for that next pixel is read (S208), and steps S202 to S207 repeat. If the conversion process has been applied to all pixels (S207 returns yes), the converted data is output to the color reduction processor 13 (S209), and the conversion process ends.

Figure 5:
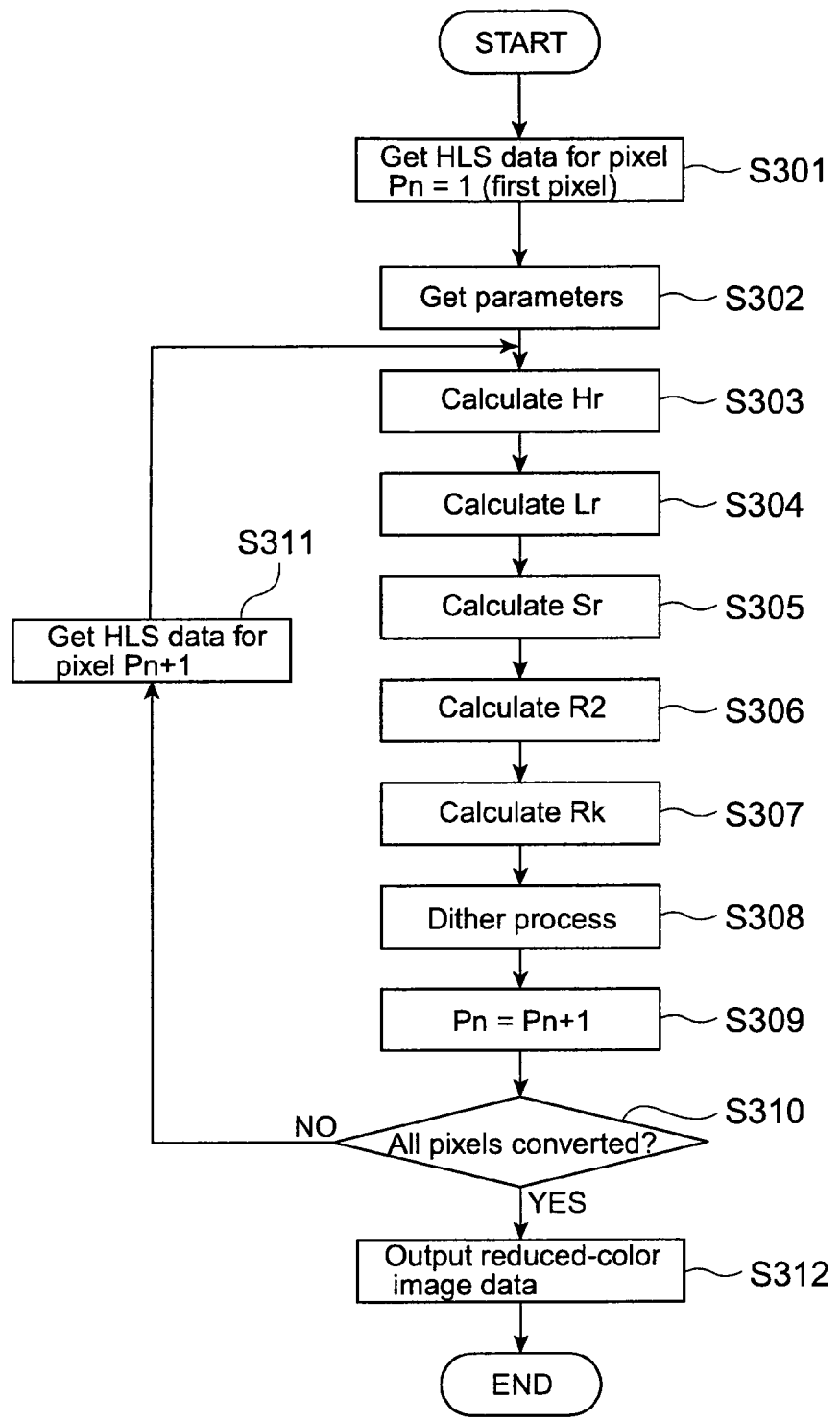
FIG. 5 is a flow chart of a preferred embodiment of the color reduction process executed as step S104 in FIG. 3.

The color reduction process (S104 in FIG. 3) is described next in connection with the flow chart of FIG. 5. The first step is to read the HLS color data for the first pixel in the color data output from the color space conversion process (S301). The set parameters are then read (S302), and then the Hr, Lr, Sr, R2, and Rk values are calculated (S303 to S307) using equations (7) to (11) described above.

A dither process is then applied based on the R2 and Rk values calculated for the current target pixel (S308). As noted above, this dither process could be a pattern dithering process or other dither process. What dither process is applied could be selected according to user input from the operating screen, and the selected dither process may be stored by the dither process selector 24. The dither processor 23 runs the dither process set by the dither process selector 24. The dither process used in the present invention could be a process known from the literature or other dither process.

The address of the target pixel Pn of the color reduction process is then incremented to the next pixel (S309), and whether the color reduction process has been applied to all pixels is determined (S310). If all pixels have not been processed (S310 returns no), data for the pixel at the next pixel address is read (S311), and steps S303 to S309 are repeated. If the color reduction process has been applied to all pixels (S310 returns yes), the reduced-color data is output to the reduced-color data storage unit 15 (S312). The reduced-color data stored in the reduced-color data storage unit 15 is presented on the display device, and output as the print data to the printer when the user issues a print command.

Printer Control Device

A preferred embodiment of a printer control device according to the present invention using the foregoing color reduction processing apparatus is described next below. The printer control device and printer control method of the present invention can be used to control printers of various types, and are described below with reference to a printer driver that is used by the host device in a POS system.

Figure 6:
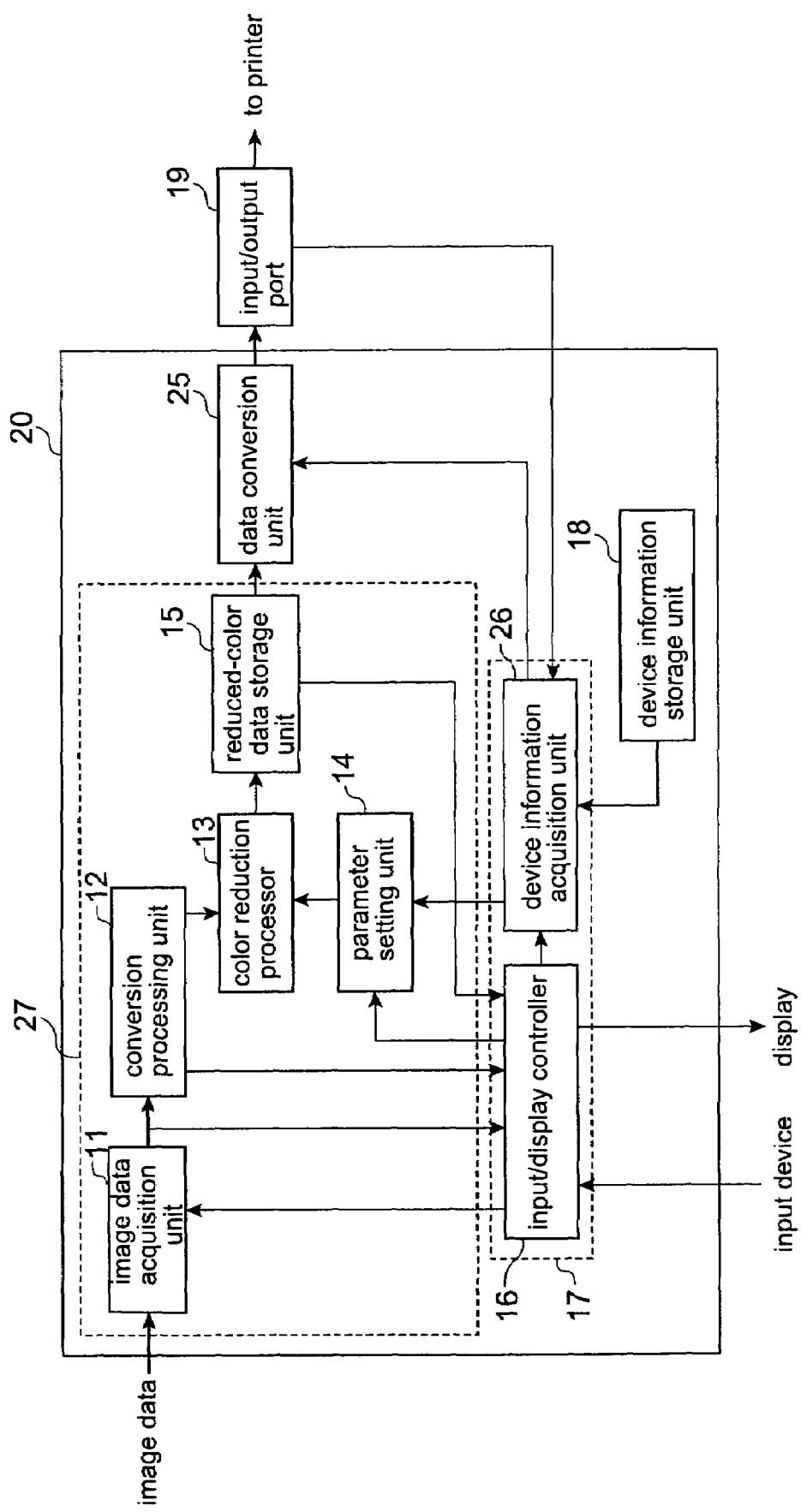
FIG. 6 is a function block diagram of a printer control device according to a preferred embodiment of the invention.

FIG. 6 is a functional block diagram of a printer control device according to this embodiment of the invention. As shown in FIG. 6, this printer control device 20 has a color reduction conversion processing unit 27, data acquisition unit 17, device information storage unit 18, and data conversion unit 25.

The color reduction conversion processing unit 27 converts the acquired RGB image data to HLS image data, and then converts the HLS image data to print image data containing up to three colors, that is, the first color, the second color, and the non-printing color, according to the defined parameters.

The data acquisition unit 17 has an input/display controller 16 and device information acquisition unit 26. The input/display controller 16 presents an operating screen on a display device, and receives user input from the operating screen. The device information acquisition unit 26 acquires printer control information for the connected printer by accessing the printer through the input/output port 19 of the host. The printer stores such information as the printable first and second colors and the print resolution, and sends this control information to the printer control device 20.

An ink-jet printer or thermal printer is normally used as the printer for printing such a first color and second color. An ink-jet printer enables easily changing the printable first color and second color by changing the color of the inkjet cartridges. The first and second colors that can be printed by a thermal printer are determined by the type of thermal paper (printing paper) or the colors of the thermal transfer ribbon, and the first and second colors can therefore be easily changed by changing the paper or ribbon. It is therefore important to determine what colors the connected printer can currently print as the first and second colors. Some of the newest ink-jet cartridges have a memory function, and accurate control information can thus be easily acquired from the ink-jet cartridge.

The acquired control information is stored in the device information storage unit 18. The control information can also be acquired through the input/display controller 16 or from an input device. The first and second colors that can be printed by the connected printer, the print resolution, the type of printing paper, and other printer-specific control information can also be prestored in the device information storage unit 18. The acquired control information is then output to the color reduction conversion processing unit 27 and data conversion unit 25.

The data conversion unit 25 converts the print image data to the print data output to the printer according to the functions of the connected printer. As a result, the data conversion unit 25 adjusts the resolution and size of the print image data according to the resolution of the printer and the size of the printing paper, for example.

Color Reduction Conversion Processing Unit 27

The configuration of the color reduction conversion processing unit 27 is substantially identical to the foregoing color reduction processing apparatus 10, differing in that the input/display controller 16 is not disposed internally. Therefore, the conversion processing unit 12, color reduction processor 13, parameter setting unit 14, and reduced-color data storage unit 15 are identified by the same reference numerals as those used in the color reduction processing apparatus 10 shown in FIG. 1.

The conversion processing unit 12 converts the RGB color image data received by the image data acquisition unit 11 to HLS data. The color reduction processor 13 then reduces the HLS image data to print image data containing the first color, the second color, and the non-printing color, and the reduced-color print image data is stored to the reduced-color data storage unit 15.

The image data acquisition unit 11 is equivalent to that shown in FIG. 1, and acquires RGB color image data according to a print request received from a higher level application. The conversion processing unit 12 converts the acquired RGB color image data to HLS color image data. This HLS conversion process is described below.

The color reduction processor 13 then reduces the resulting HLS image data to print image data containing the first color, the second color, and the non-printing color according to the parameters stored in the parameter setting unit 14. The first and second colors that are printable by the printer, and information (such as the hue range) used in the color reduction process, are stored in the parameter setting unit 14. The parameters are stored as defined until they are changed. The parameters can be set and changed according to input from the data acquisition unit 17.

Parameter Setting

The parameter setting unit 14 is also configured substantially identically to the parameter setting unit of the color reduction processing apparatus 10. The device information acquisition unit 26 in a printer control device according to this embodiment of the invention acquires the first and the second color data from information relating to the type (color) of ink cartridge or the type (color) of thermal transfer ribbon or printing paper installed in the printer. A color other than the colors that can be printed by the printer could also be set as the first or the second print color in a special application, in which case the image that is actually printed by the printer will also differ from the image output by the color reduction process.

A parameter defining what range of hues in the HLS image data should be converted to the second color can also be changed. The changed hue range parameter is also stored in the parameter setting unit 14. Increasing or decreasing this hue range Hs parameter can also change the appearance of the image resulting from the print image data after the color reduction process.

The starting point of the hue range can also be set automatically by the parameter setting unit 14 according to the hue of the second print color acquired from the printer by the device information acquisition unit 26. For example, if the second color is green, the starting point of the hue range is set to 80° because the hue angle H of green is 80°. If the second color is blue, the starting point of the hue range is likewise set to 240° because the hue angle H of blue is 240°.

Conversion from RGB to HLS, and Color Reduction to the First and Second Colors

The RGB color image data received by the image data acquisition unit 11 is then output to the conversion processing unit 12. The conversion processing unit 12 converts each pixel in the RGB color image data to H, L, and S values. Hue (H) is expressed as an angle in the range of 0° to 360°, and lightness (L) and saturation (S) as a percentage in the range of 0% to 100% (or values 0.00 to 1.00). The process for converting the RGB color image data to HLS color image data is the same as the conversion process run by the color reduction processor described above. The conversion processing unit 12 then outputs the converted HLS data to the color reduction processor 13. The color reduction processor 13 then runs the color reduction process converting the HLS data to the first color and the second color.

The color reduction processor 13 calculates the ratio between the first color and the second color for each pixel in the HLS data, dithers the result, and outputs the resulting print image data. A preferred embodiment of the color reduction processor 13 is described above with reference to FIG. 2. This conversion process and color reduction process can be executed by a microprocessor (CPU) running a control program stored in memory or other storage device using specific data also stored in memory or other storage device.

Processes Executed by the Printer Control Device

Figure 7:
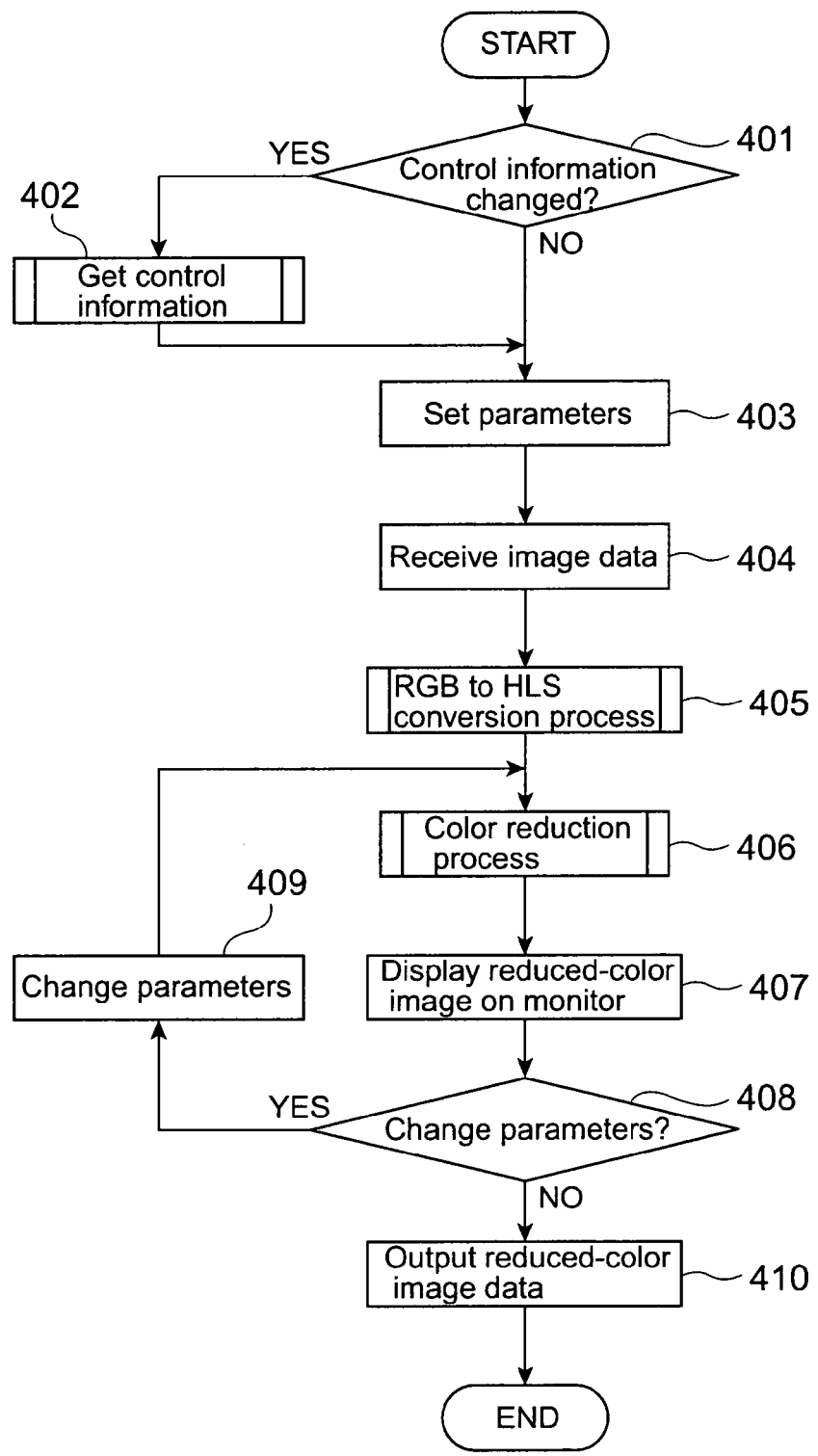
FIG. 7 is a flow chart of the conversion process run by a printer control device, according to a preferred embodiment of the invention.

The parameter setting process and other processes executed by the printer control device are described next with reference to FIG. 7, a flow chart of the parameter setting and color reduction process executed by a printer control device according to this embodiment of the invention.

The first step is to determine whether to change the control information including the first color and the second color (S401). If the control information is to be changed (S401 returns yes), the control information is acquired from the printer (S402). This control information is changed when, for example, the connected printer is changed, the ink cartridge type (color) is changed, or the printing paper type is changed. Once this control information is set, the control information is not changed unless the printer is replaced or the ink cartridge or paper type is changed and the related parameters must be updated. If the control information is not changed (S401 returns no), specific parameters such as the hue range are set as needed, and the settings are then saved (S403).

The image data acquisition unit 11 then receives. the RGB color image data that is used as the original image in the color reduction process (S404). Steps S405 to S410 executed after the RGB color image data is received are the same as steps S103 to S108 in the process shown in FIG. 3. Note that unless the saved parameters are changed once the parameters are set and stored in step S403, the color reduction process uses those set parameters in steps S405 and S406 to process the RGB color image data output from the application to the image data acquisition unit 11. The color space conversion process in S405 and the color reduction process in S406 are the same as described above with reference to FIG. 4 and FIG. 5, respectively.

The color reduction processing apparatus, printer control device, color reduction method, and printer control method of the present invention are described above as applying the color reduction process to the HLS data after first converting all pixels in the original image from RGB to HLS data. It will be apparent, however, that the color conversion process and color reduction process could be applied sequentially by pixel-by-pixel so that, for example, the color conversion process and color reduction process are both applied to one pixel, and then applied to each subsequent pixel sequentially until all pixels have been processed.

The color expression used in the color reduction process based on hue as described above is close to human color perception, and can therefore generate a reduced-color image (print image data) that is close to the original image. A logo or product image that closely resembles the original image can therefore be printed in a POS system using three colors (the first color, the second color, and the non-printing color of the print medium). Furthermore, when creating a reduced-color image having three colors from a full-color image for registration as the logo data, for example, in a POS printer, the appearance of the reduced-color image created by changing the hue range can be confirmed visually, and the registered image data can therefore be created more easily.

Other Embodiments of the Color Reduction Processing Apparatus and Printer Control Device The color reduction process is based on hue in the foregoing embodiment of the invention, but the second color can be assigned using only lightness L and saturation S without using hue H. Lightness L or saturation S could also be set as valid or invalid parameters. More specifically, the color reduction process can be applied using only one of the hue H, lightness L, and saturation S values. In this case the ratio R2 of the second color is calculated using equation (10) above using a value of 1 for the hue ratio Hr, the lightness ratio Lr, or the saturation ratio Sr that is not used in the color reduction process. This enables creating a variety of images according to the lightness or saturation value.

The H, L, and S values can also be defined separately for the second color. For example, the HLS values are set to (0°, 29.7%, 100%) in the foregoing embodiment when the second color is red, but the red that is actually used for printing is usually not pure red. More accurate color reduction can be enabled in such cases by setting the HLS values of the second color to the HLS values of the second color that is actually printed.

Furthermore, when a color that is different from the colors that can be printed by the printer is set as the second color, the image displayed on the monitor can be drawn using the colors that will actually be printed. The results of the color reduction process can thus be confirmed by viewing the image that will actually be printed.

Furthermore, by applying the color reduction process using a second color that is different from the colors printable by the printer, even colors that will disappear in a color reduction process using a second color that can be printed by the printer can be expressed by the printer. This process is useful when the original image is an image in which a key color is different from the second color that can be printed by the printer. For example, if the color reduction process is applied using red as the second color when the second color printable by the printer is red and the key color in the original image is blue, bluish colors will become white (the non-printing color) and disappear, However, if the color reduction process is based on blue, the bluish colors will not disappear in the reduced-color image. When the print image data output by the color reduction process based on the key colors in the original image is then printed by the printer, the bluish colors will be printed using red, that is, the second color printable by the printer, in the reduced-color image, and the characteristic features of the original image will not be lost and can be reproduced in the reduced-color image.

Figure 8:
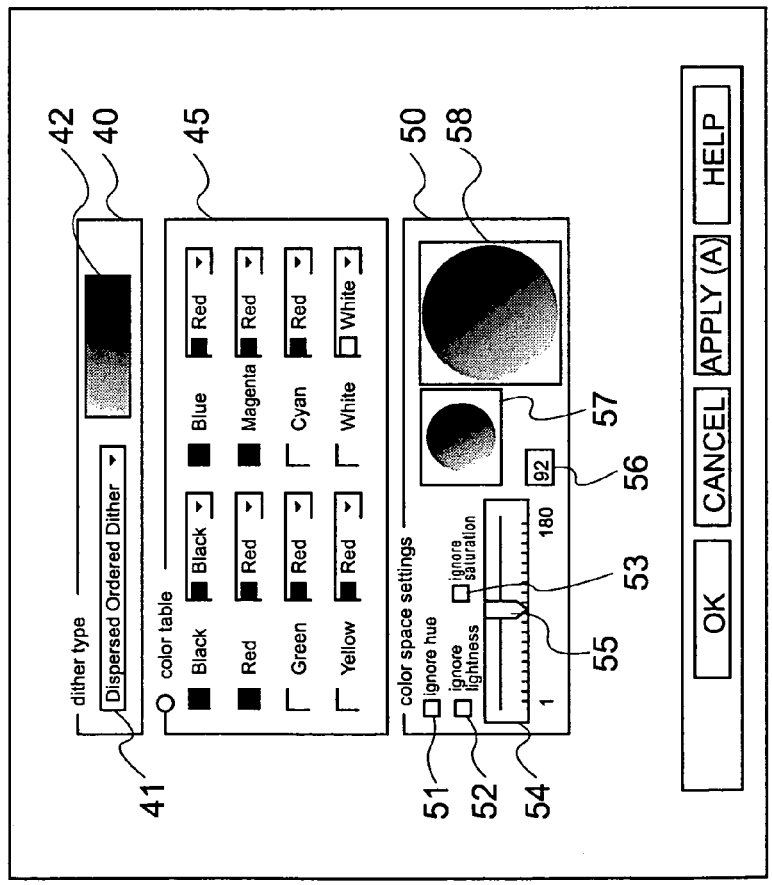
FIG. 8 is an exemplary screen of a graphical user interface (GUI) for use in color reduction processing, according to a preferred embodiment of the invention.

FIG. 8 shows an exemplary operating screen of a GUI used in a color reduction processing apparatus according to the present invention. In this example the first color is set to black and the second color is set to red. A dither method selection menu 41 and dither sample display area 42 are provided in the dither type selection box 40 in the top row.

For each of the eight colors red, green, blue, cyan, magenta, yellow, black, and white, the color table 45 in the middle provides controls for selecting whether that color is converted to black, red, or white. The color table 45 is used when applying a conventional color reduction process.

An HLS color space conversion controller 50 is provided at the bottom. If hue H is not used for the color space conversion, the "ignore hue" control 51 is checked. If lightness L or saturation S is not used for conversion, the corresponding "ignore lightness" control 52 or "ignore saturation" control 53 is likewise selected. If hue H is used for conversion, the slider 55 in the hue range control 54 is set to the desired position in the range 1° to 180° to define the hue range. The hue range selected by the slider 55 is also shown as numeric angle in the hue range display box 56. An original image color monitor 57 is provided above and a reduced-color image color monitor 58 is provided to the right of the hue range display box 56.

Figure 9:
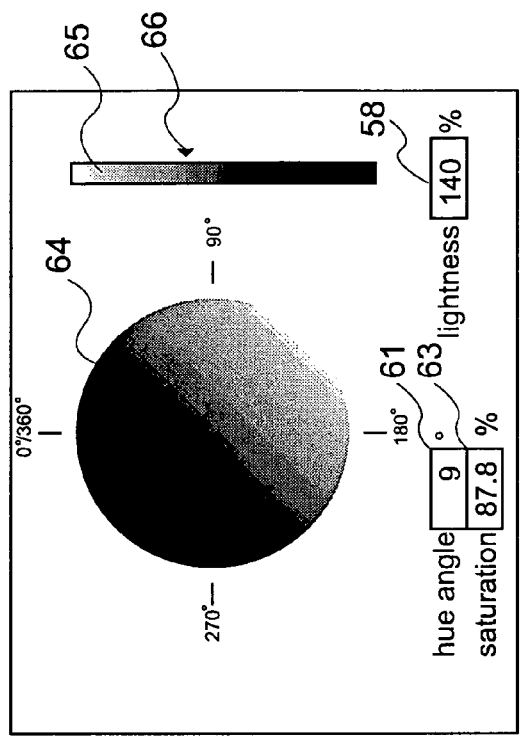
FIG. 9 is an exemplary screen of a GUI that enables setting the HLS values of the second color in a preferred embodiment of the present invention.

FIG. 9 shows an operating screen of GUI in which the HLS values of the second color can also be set. The reference point (starting point) of the hue range, the lightness, and the saturation of the second color can be set using the respective hue angle input box 61, lightness input box 62, and saturation input box 63. A color ring 64 shows the hue and saturation, and a "+" cursor can be displayed at the color corresponding to the specified hue and saturation parameters. A slider 66 is displayed at the position corresponding to the specified lightness parameter in the lightness slider bar 65 shown to the right of the color ring 64.

The hue and saturation values of the second color could also be specified by using a pointing device to move the + cursor to the desired position in the color ring 64, and the slider 66 could likewise be moved to the desired position in the lightness slider bar 65 to set the lightness value. In this case the HLS values specified by moving the + cursor and slider 66 with the pointing device are also displayed in the corresponding input boxes 61 to 63.

If the printer control device is a general purpose personal computer or other host computer, the color reduction processing apparatus and color reduction method described above can be provided in the printer driver. The color reduction processing apparatus and color reduction method can also be applied in a color reduction processing apparatus for a logo data generator used to create a logo or other reduced-color image from a full-color original image.

Figure 10:
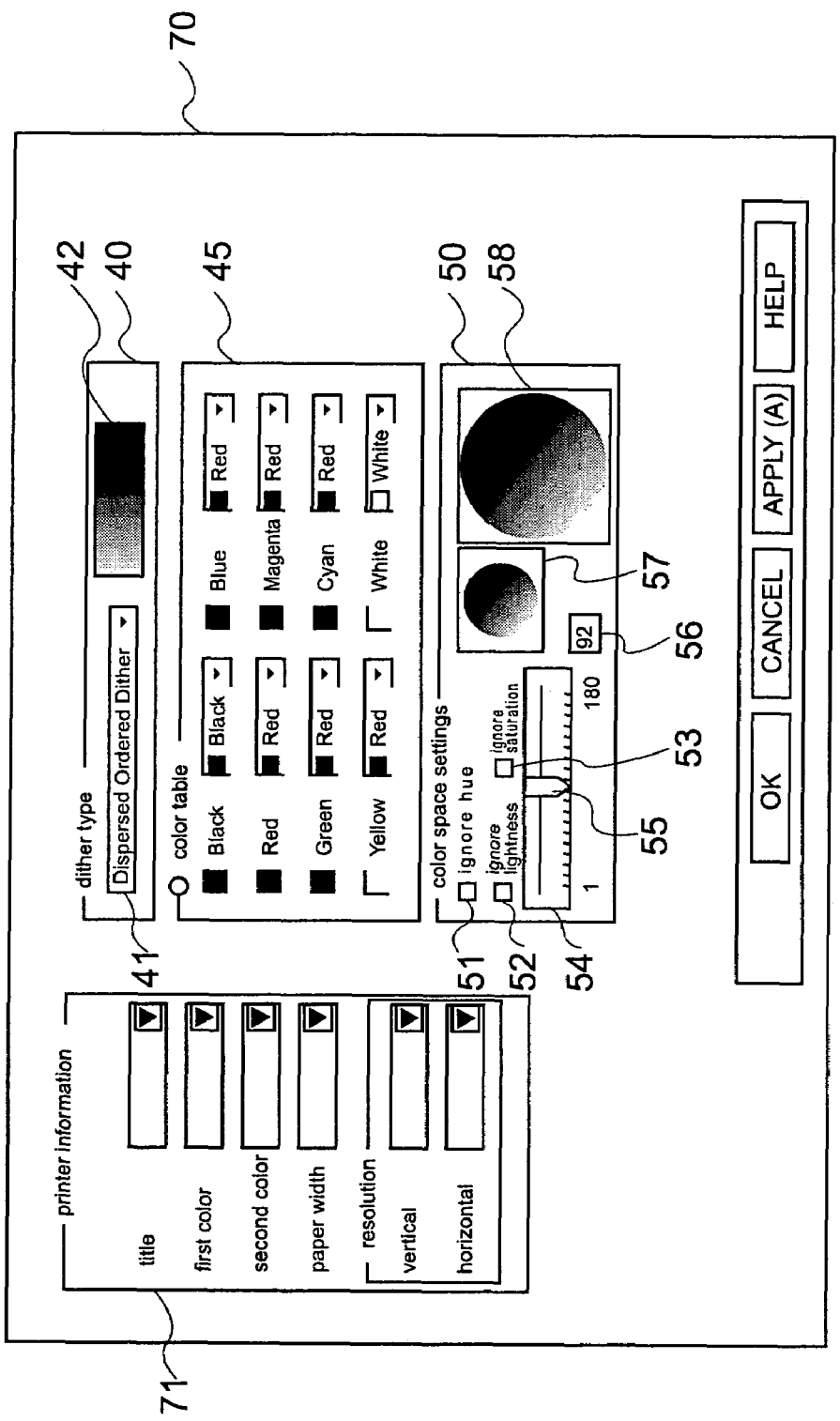
FIG. 10 is an exemplary screen of a GUI presented by a printer control device, according to a preferred embodiment of the invention.

FIG. 10 shows an exemplary operating screen 70 in a printer control device according to a preferred embodiment of the invention. A printer information input table 71 for entering printer information is provided at the top left part of the screen. The top item in the printer information input table 71 is an input box for entering a title for the printer information. This title input box is used when controlling multiple similar printers with a single printer control device. When the model number of a particular printer is entered in this title input box, the colors that can be specified as the first color and the second color are automatically displayed in corresponding pull-down menus based on the model number, thus enabling easier selection of the first color and the second color. The printer information includes the first and second colors, the paper width, and the printer resolution. Clicking on the triangles on the right end of each input box causes a drop-down menu to appear, thus facilitating parameter entry. The control information acquired from the printer by the device information acquisition unit 26 is automatically displayed as the initial values in this printer information input table 71 in a preferred embodiment of the invention.

Controls for setting the parameters needed in the color reduction process are provided in the middle of the screen. These controls are as described and shown in FIG. 8.

As will be understood from the foregoing description, the present invention enables converting RGB color image data to HLS color image data, and specifying colors based on hue H when converting an original color image to a first color and second color. Hue H in the HLS color space is defined by the angle in a 360° circle ranging sequentially from red to orange, yellow, green, blue, indigo, and purple. The colors are thus easy to grasp visually, and the color reduction process can produce the image intended by the user.

Although preferred embodiments of the present invention have been described with reference to the accompanying drawings, it will be apparent to those skilled in the art that various changes and modifications can be made. Such changes and modifications are included within the invention to the extent that they fall within the scope of the appended claims.

What is claimed is:

1. A color reduction processing apparatus, comprising:
an image data acquisition unit configured to acquire RGB color image data defined by RGB color values;
a conversion processing unit configured to convert the RGB color image data to HLS color image data defined by HLS color values; and
a color reduction processing unit configured to convert the HLS color image data to print image data that comprises a first color, a second color, and a non-printing color based on specific parameters;
a parameter setting unit configured to set a hue range Hs for the second color, wherein the color reduction processing unit converts the HLS color image data to print image data based on the hue range Hs setting; and
wherein the first color is black, and the color reduction processing unit comprises:
a hue ratio calculation unit configured to calculate a hue ratio Hr based on the equation:

$Hr = 1 - ||180 - |Hp - H2|| - 180|/Hs,$ where Hp denotes the hue of a target pixel and H2 denotes the hue of the second color, where, if $Hr \leq 0$, then Hr is set to 0;
a lightness ratio calculation unit configured to calculate a lightness ratio Lr between the lightness of the target pixel Lp and the lightness of the second color L2 based on the equation:

$Lr = (1 - Lp)/(1 - L2),$ where if $Lr \geq 1$, then Lr is set to Lp/L2, and Lp and L2 are set to values in the range of 0.00 to 1.00;
a saturation ratio calculation unit configured to calculate a saturation ratio Sr between the saturation of the target pixel Sp and the saturation of the second color S2 based on the equation:

$Sr = Sp/S2,$ where if $Sr \geq 1$, then Sr is set to 1;
a second color data calculation unit configured to calculate a second color ratio R2 based on the hue ratio Hr, the lightness ratio Lr, and the saturation ratio Sr based on the equation:

$R2 = Hr * Lr * Sr,$ where * denotes multiplication; and
a first color data calculation unit configured to calculate a first color ratio Rk based on the equation:

$Rk = 1 - Lp - R2 * (1 - L2).$

2. A color reduction processing apparatus as described in claim 1, wherein the hue range Hs is set as a value in the range of 1° to 180°.

3. A color reduction processing apparatus as described in claim 1, wherein at least one of the hue H2, the lightness L2, or the saturation S2 of the second color is defined as a parameter.

4. A color reduction processing apparatus as described in claim 1, wherein the print image data generated by the color reduction processing unit is converted to a color different from the second color and displayed.

5. A printer control device, comprising:
a data acquisition unit configured to acquire specific information including color information indicating a first color and a second color that can be printed by a printer;
an image data acquisition unit configured to receive RGB color image data defined by RGB color values;
a conversion processing unit configured to convert the RGB color image data to HLS color image data defined by HLS color values;

a color reduction processing unit configured to convert the HLS color image data to print image data that comprises the first color, the second color, and a non-printing color;

a data conversion unit configured to convert the print image data to a specific data format that is printable by the printer; and a parameter setting unit configured to set a hue range as a parameter;

wherein the color reduction processing unit changes the hue starting point used as a reference point of the hue range according to the color information for the second color, and converts the HLS color image data to the print image data based on the starting point and the hue range;

wherein the data acquisition unit acquires the specific information from a printer in communication with the printer control device;

wherein the first color is black, and the color reduction processing unit comprises:

a hue ratio calculation unit configured to calculate a hue ratio Hr based on the equation:

$Hr=1-||180-|Hp-H2||-180|/Hs.$ where Hp denotes the hue of a target pixel and H2 denotes the hue of the second color, where, if $Hr \leqq 0$, then Hr is set to 0;

a lightness ratio calculation unit configured to calculate a lightness ratio Lr between the lightness of the target pixel Lu and the lightness of the second color L2 based on the equation:

$Lr=(1-Lp)/(1-L2),$ where if $Lr \geqq 1$, then Lr is set to Lp/L2, and Lp and L2 are set to values in the range of 0.00 to 1.00;

a saturation ratio calculation unit configured to calculate a saturation ratio Sr between the saturation of the target pixel Sp and the saturation of the second color S2 based on the equation:

$Sr=Sp/S2,$ where if $Sr \geqq 1$, then Sr is set to 1;

a second color data calculation unit configured to calculate a second color ratio R2 based on the hue ratio Hr, the lightness ratio Lr, and the saturation ratio Sr based on the equation:

$R2=Hr*Lr*Sr,$ where * denotes multiplication: and a first color data calculation unit configured to calculate a first color ratio Rk based on the equation:

$Rk=1-Lp-R2*(1-L2).$

6. A color reduction method, comprising:

(a) converting RGB color image data defined by RGB color values to HLS color image data defined by HLS color values;

(b) converting the HLS color image data to print image data that comprises a first color, a second color, and a non-printing color based on specific parameters;

(c) setting a hue range Hs as a parameter for conversion;

wherein step (b) comprises converting the HLS color image data to the print image data based on the set hue range Hs;

wherein the first color is black, and step (b) comprises:

(b1) calculating a hue ratio Hr based on the equation:

$Hr=1-||180-|Hp-H2||180|/Hs.$ where Hp denotes the hue of a target pixel and H2 denotes the hue of the second color, where, if $Hr \leqq 0$, then Hr is set to 0;

(b2) calculating a lightness ratio Lr between the lightness of the target pixel Lp and the lightness of the second color L2 based on the equation:

$Lr=(1-Lp)/(1-L2).$ where if $Lr \geqq 1$, then Lr is set to Lp/L2, and Lp and L2 are set to values in the range of 0.00 to 1.00;

(b3) calculating a saturation ratio Sr between the saturation of the target pixel SD and the saturation of the second color S2 based on the equation:

$Sr=Sp/S2,$ where if $Sr \geqq 1$, then Sr is set to 1:

(b4) calculating a second color ratio R2 based on the hue ratio Hr, lightness ratio Lr, and the saturation ratio Sr based on the equation:

$R2=Hr*Lr*Sr,$ where * denotes multiplication; and (b5) calculating a first color ratio Rk based on the equation:

$Rk=1-Lp-R2*(1-L2).$

7. A color reduction method as described in claim 6, wherein the hue range Hs is set as a value in the range of 1° to 180°.

8. A color reduction method as described in claim 7, wherein at least one of the hue H2, lightness L2 or saturation S2 of the second color is defined as a parameter.

9. A color reduction method as described in claim 7, further comprising:

(d) converting the print image data generated in step (b) to a color different from the second color and displaying the result.

10. A printer control method, comprising:

(a) acquiring RGB color image data defined by RGB color values;

(b) converting the RGB color image data to HLS color image data defined by HLS color values;

(c) converting the HLS color image data to print image data that comprises a first color and a second color printable by a printer, and a non-printing color;

(d) converting the print image data to a specific data format that is printable by the printer;

(e) acquiring specific information including color information indicating the first color and the second color; and (f) acquiring a hue range as a parameter;

wherein step (c) comprises changing the hue starting point used as the reference point of the hue range according to the color information for the second color, and converting the HLS color image data to the print image data based on the starting point and the hue range;

wherein the first color is black, and step (c) comprises:

(c1) calculating a hue ratio Hr based on the equation:

$Hr=1-||180-|Hp-H2||-180|/Hs.$ where Hy denotes the hue of a target pixel and H2 denotes the hue of the second color, where, if $Hr \geqq 0$, then Hr is set to 0;

(c2) calculating a lightness ratio Lr between the lightness of the target pixel Lp and the lightness of the second color L2 based on the equation:

$Lr=(1-Lp)/(1-L2),$ where if $Lr \geqq 1$, then Lr is set to Lp/L2, and Lp and L2 are set to values in the range of 0.00 to 1.00;

(c3) calculating a saturation ratio Sr between the saturation of the target pixel Sv and the saturation of the second color S2 based on the equation:

$Sr=Sp/S2,$ where if $Sr \geq 1$, then Sr is set to 1;

(c4) calculating a second color ratio R2 based on the hue ratio Hr, lightness ratio Lr, and the saturation ratio Sr based on the equation:

$R2=Hr*Lr*Sr,$ where * denotes multiplication; and (c5) calculating a first color ratio Rk based on the equation:

$Rk=1-Lp-R2*(1-L2).$

11. A printer control method as described in claim 10, wherein, in step (e), the specific information is acquired from a printer.

12. A printer control method as described in claim 10, wherein step (d) comprises adjusting the resolution and image size of the print image data based on the width of the printing paper and the print resolution.

* * * * *

UNITED STATES PATENT AND TRADEMARK OFFICE
CERTIFICATE OF CORRECTION

PATENT NO. : 7,474,446 B2
APPLICATION NO. : 11/000475
DATED : January 6, 2009
INVENTOR(S) : Yukiharu Horiuchi et al.

It is certified that error appears in the above-identified patent and that said Letters Patent is hereby corrected as shown below:

Column 16, Line 27, change "$Lr \geqq 1$" to --$Lr \geq 1$--

Line 35, change "$Sr \geqq 1$" to --$Sr \geq 1$--

Column 17, Line 21, change "." to --,--

Line 23, change "$Hr \geqq 0$" to --$Hr \geq 0$--

Line 30, change "$Lr \geqq 1$" to --$Lr \geq 1$--

Line 37, change "$Sr \geqq 1$" to --$Sr \geq 1$--

Line 60, change "." to --,--

Column 18, Line 2, change "if $Hr \geqq 0$" to --if $Hr \geq 0$--

Line 7, change "." to --,--

Line 12, change "SD" to --Sp--

Line 56, change "." to --,--

Line 57, change "Hy" to --Hp--

Line 58, change "$Hr \geqq 0$" to --$Hr \geq 0$--

Column 19, Line 2, change "Sy" to --Sp--

Signed and Sealed this

Thirteenth Day of July, 2010

David J. Kappos
*Director of the United States Patent and Trademark Office*